Patented Jan. 24, 1950

2,495,217

UNITED STATES PATENT OFFICE 2,495,217

CONFECTION STOCK

Mary Presto Annarilli, Bridgeton, N. J.

No Drawing. Application March 18, 1946,
Serial No. 655,373

16 Claims. (Cl. 99—134)

This invention relates to a confection, and particularly fudge, wherein a mixture of ingredients supplied in a package may be mixed with cold water and cooked to form the finished edible product.

In view of the limited supply of substantially all products, it is desired to eliminate waste, and it has been found possible to combine the ingredients required for making candy or fudge in a complete package similar to packages containing pancake flour and the like wherein one unskilled in candy making may readily mix and cook the ingredients, and, if desired, apply a marshmallow paste to form candy or fudge.

Making confections, and particularly fudge, in this manner eliminates all failures, and thereby waste of products that are critical at the present time. Preparing and mixing the ingredients in a laboratory also makes it possible to provide the ingredients in the exact proportions required, whereby even a novice may make candy of delicious flavor and of the highest quality.

With these conditions in view, the invention has as its foremost objective the provision of a novel formula for combining ingredients of confections in a dehydrated form wherein they will keep indefinitely and are not subject to loss of flavor or quality upon standing.

This invention, therefore, contemplates the use of a plurality of ingredients in dry or powdered form which are mixed in such proportions that when prepared, by adding water and cooking and then adding marshmallow, an edible confection is formed.

The purpose of this invention is, therefore, to provide ingredients and a method of combining same wherein these ingredients may be packaged and then removed from the package and readily prepared to form an edible product. The usual ingredients of a confection of this type will, upon being dehydrated, lose some of their characteristics, and particularly their normal flavor, and, therefore, an object of this invention is to provide a mixture of ingredients which, when dehydrated, packaged, and then opened and prepared, will maintain their original characteristics.

A further object of this invention is to provide suitable ingredients which, when dehydrated, packaged and prepared, will contain such characteristics that only water is required for mixing in order to provide a confection of unusual quality.

With these and other ends in view, the invention embodies a mixture containing granulated sugar, powdered whole milk, powdered skim milk, powdered whole roasted milk, cream, cocoa, varilla, and cream of tartar in such proportions that when properly prepared and marshmallow is added, a confection such as fudge will be formed.

In preparing the mixture, it is preferred to use the ingredients in the following proportions:

2 cups of sugar
2 level tablespoons of powdered whole milk
1 level tablespoon of powdered skim milk
1 level tablespoon of powdered whole roasted milk
1 level teaspoon of powdered cream
4 level tablespoons of cocoa
¼ level teaspoon of powdered vanilla
¼ level teaspoon of cream of tartar Although the above proportions are specified, it will be understood that the relative quantities of the different ingredients may be varied to compensate for different conditions, and other ingredients such as flavoring may be used or added.

These ingredients may be provided and combined in a physical mixture by any suitable means, and after thoroughly mixing, they may be placed in packages containing the same or different quantities, and the packages may be sealed making them air tight, or any type of package may be used, and the package may be formed of any material.

With this mixture or stock, fudge may readily be made by thoroughly mixing the product with cold water, preferably with a wood mixing spoon. The mixture is then heated over a low fire during which period it is stirred continuously to prevent sticking. The heat is then increased, the stirring continued, and after it has reached the boiling point and is boiled for a comparatively short period of time, it is removed from the fire. Stirring is then discontinued, and the product cooled. Then the marshmallow is added and the product beaten. The product is then poured into a pan or on a flat, buttered surface for cooling.

In preparing a specific mixture, it is preferred to use the following:

|  | Per cent |
|---|---|
| Sugar | 80.6 |
| Powdered whole milk | 04.6 |
| Powdered skim milk | 02.3 |
| Powdered roasted milk | 02.3 |
| Powdered cream | 00.8 |
| Cocoa | 09.0 |
| Vanilla | 00.2 |
| Cream of tartar | 00.2 |

These products, in the above proportions, are provided in a package or container, and in a separate package in the same container, two ounces of marshmallow are provided.

The contents of a package or container of the above ingredients, substantially in the proportions noted, except the marshmallow, are placed in a two quart utensil, and to this mixture, one half of a cup of cold water in added. The mixture is thoroughly mixed with a wood spoon.

The utensil with the thoroughly mixed ingredients therein is placed over a low fire for substantially five minutes, during which time the mixture is stirred continuously to prevent sticking. The heat is then increased to a medium fire, the mixture being stirred constantly. Cooking is continued until the mixture reaches the boiling point, and then it is boiled, the stirring continued constantly, for from three to three and a half minutes. After this period of time, it is removed from the fire and cooled, by placing the utensil in cold water for about one minute. During this cooling period, stirring is discontinued. The utensil is then removed from the cold water, and the two ounces of marshmallow in the small packet of the package are added. The mixture is then beaten vigorously for about two minutes, and then poured into a buttered pan for cooling. Chopped nuts, cocoanut, and the like may be added at the same time marshmallow is added if desired.

The resulting product is substantially one pound of a confection commonly known as fudge.

While a preferred specific embodiment of the invention has been hereinbefore set forth, it is to be clearly understood that the invention is not to be limited to the particular quantities and proportions specified, nor to the exact steps described because various modifications of these details may be provided in putting the invention into practice within the purview of the appended claims.

What is claimed is:

1. A confection stock comprising, in combination, granulated sugar, powdered milk, powdered cream, cocoa, cream of tartar, and flavoring, characterized in that the powdered milk consists of whole milk, skim milk, and roasted milk.

2. A confection stock comprising, in combination, granulated sugar, powdered milk, powdered cream, cocoa, cream of tartar, and flavoring, a characterized in that the milk content contains roasted milk.

3. A confection stock comprising, in combination, granulated sugar, powdered milk, powdered cream, cocoa, cream of tartar, and flavoring, characterized in that vanilla is used as the flavoring, and the milk content contains roasted milk.

4. A confection stock comprising the combination of whole, skim, and roasted milk and cream in powdered form, a flavoring agent, a sweetening agent, and seasoning.

5. A confection stock comprising a combination of whole, skim, and roasted milk in powdered form, powdered cream, granulated sugar, cocoa, flavoring, and cream of tartar.

6. A confection stock comprising a combination of whole, skim, and roasted milk in powdered form, powdered cream, granulated sugar, cocoa, flavoring, cream of tartar, and mashmallow.

7. A composition of matter comprising in combination the following ingredients in the proportions specified:

| | Per cent |
|---|---|
| Granulated sugar | 80.6 |
| Powdered whole Milk | 04.6 |
| Powdered skim milk | 02.3 |
| Powdered roasted milk | 02.3 |
| Powdered cream | 00.8 |
| Cocoa | 09.0 |
| Vanilla | 00.2 |
| Cream of tartar | 00.2 |

8. A composition of matter comprising in combination the following ingredients in the proportions specified:

| | Per cent |
|---|---|
| Granulated sugar | 80.6 |
| Powdered whole Milk | 04.6 |
| Powdered skim milk | 02.3 |
| Powdered roasted milk | 02.3 |
| Powdered cream | 00.8 |
| Cocoa | 09.0 |
| Vanilla | 00.2 |
| Cream of tartar | 00.2 |

And marshmallow.

9. A composition of matter comprising in combination the following ingredients in the proportions specified:

| | Per cent |
|---|---|
| Granulated sugar | 80.6 |
| Powdered whole Milk | 04.6 |
| Powdered skim milk | 02.3 |
| Powdered roasted milk | 02.3 |
| Powdered cream | 00.8 |
| Cocoa | 09.0 |
| Vanilla | 00.2 |
| Cream of tartar | 00.2 |

And marshmallow, characterized in that said products are incorporated in individual packages, with the marshmallow in a separate packet therein.

10. The food product herein described, consisting of powdered skim milk, powdered whole milk, powdered roasted milk, granulated sugar, flavoring, and a leavening agent.

11. The process of forming confections, which comprises mixing a powder consisting of granulated sugar, powdered whole milk, powdered skim milk, powdered roasted milk, powdered cream, cocoa, vanilla, and cream of tartar with cold water, boiling for from three to three and a half minutes, adding mashmallow, and cooling.

12. A fudge composition comprising, granulated sugar, powdered whole milk, powdered skim milk, powdered cream, powdered cocoa, cream of tartar in powdered form, powdered vanilla, and sufficient powdered roasted milk to influence the flavor and color of the finished product and also to give the product a rich creamy taste, and in combination therewith a comparatively small quantity of marshmallow.

13. A dry uncooked fudge powder containing in addition to the usual fudge ingredients, powdered roasted milk.

14. A dry uncooked fudge powder containing in addition to the usual fudge ingredients, powdered roasted milk, powdered whole milk, and powdered cream.

15. A fudge composition comprising, granulated sugar, powdered whole milk, powdered skim milk, powdered cream, powdered cocoa, cream of tartar in powdered form, powdered vanilla, and sufficient powdered roasted milk to influence the flavor and color of the finished product and also give the product a rich creamy taste, and in combination therewith a comparatively small quantity of marshmallow, said fudge composition characterized in that the whole milk and cream eliminate the necessity of using the usual butter or shortening, and further characterized in that upon cooking a true fudge having a fine grained, non-sticky, smooth texture with a rich, wholesome, and creamy taste and delicious flavor is produced which will maintain softness and freshness over a long period of time.

16. The process of making fudge, which comprises mixing ingredients consisting of granulated sugar, powdered whole milk, powdered skim milk, powdered roasted milk, powdered cream, cocoa, vanilla, anad cream of tartar with cold water, then heating said ingredients over a comparatively low fire for substantially five minutes while stirring continuously, then increasing the heat to a comparatively medium fire while continuing the stirring, then boiling the ingredients while stirring constantly for from three to three and a half minutes, and then removing the mixture from the fire and cooling.

MARY PRESTO ANNARILLI.

REFERENCES CITED

The following references are of record in the file of this patent:

UNITED STATES PATENTS

| Number | Name | Date |
| --- | --- | --- |
| 2,210,856 | Hellwig et al. | Aug. 6, 1940 |
| 2,221,563 | Young | Nov. 12, 1940 |